L. E. MARVIN.
SAFETY DEVICE FOR PREVENTING HOT JOURNALS.
APPLICATION FILED APR. 17, 1912.
1,058,993.
Patented Apr. 15, 1913.
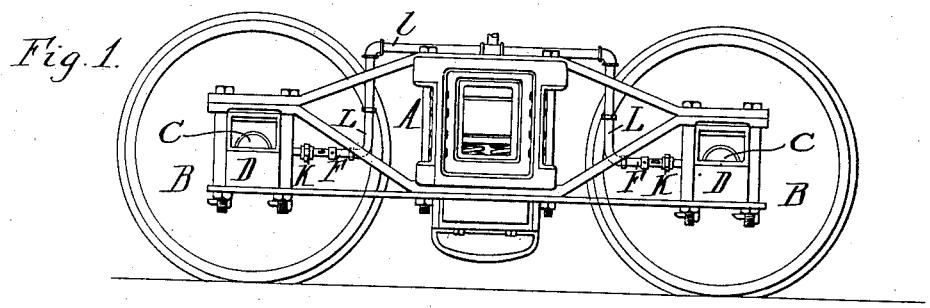
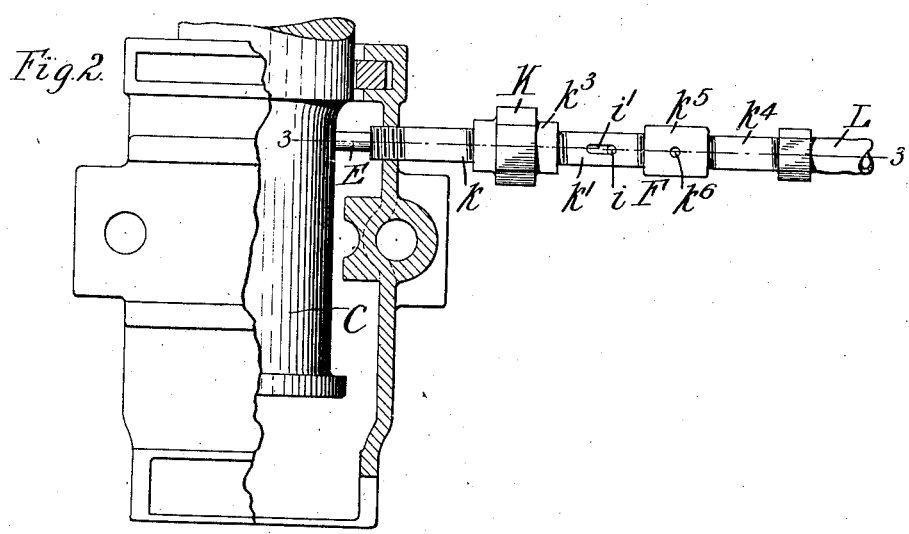
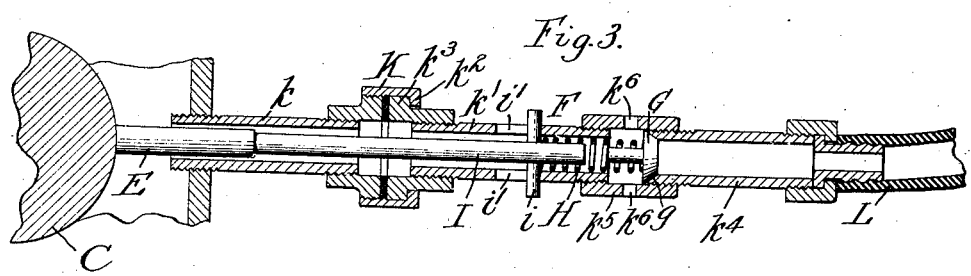
Witnesses:—
Inventor
Lester E. Marvin
Attorneys

UNITED STATES PATENT OFFICE.

LESTER E. MARVIN, OF BUFFALO, NEW YORK.

SAFETY DEVICE FOR PREVENTING HOT JOURNALS.

1,058,993.  Specification of Letters Patent.  Patented Apr. 15, 1913.

Application filed April 17, 1912. Serial No. 691,331.

*To all whom it may concern:*

Be it known that I, LESTER E. MARVIN, a citizen of the United States, residing at Buffalo, in the county of Erie and State of New York, have invented a new and useful Improvement in Safety Devices for Preventing Hot Journals, of which the following is a specification.

This invention relates to safety devices for preventing the excessive heating of the journals of railroad or other cars by coöperating with the air brake system to cause the brakes to be applied when the journal becomes abnormally hot.

The objects of this invention are to produce a device of this kind of improved construction, in which a fusible member is held in contact with the journal, so as to be readily fused by the heat thereof in the event that the journal becomes heated above a predetermined degree; also to so connect the fusible member with a valve in the air brake system that the fusible member can be readily replaced if necessary.

In the accompanying drawings, Figure 1 is a side elevation of a car truck provided with a device for preventing the heating of the journals, embodying the invention. Fig. 2 is a plan view of the device on an enlarged scale, showing the same secured in position on a journal box. Fig. 3 is a sectional elevation thereof on a still larger scale on line 3—3, Fig. 2.

Like reference characters refer to like parts in the several figures.

A represents the side frame of a car truck, B the wheels of the truck, C the journals and D the journal boxes. All of these parts may be of any suitable or usual construction.

The safety device comprises a fusible member or rod, which bears against the car journal and is adapted to control a valve connected with the air brake system of a car or train in such a manner that if the journal becomes hot enough to melt the fusible member, the valve will discharge air from the air brake system and thereby cause the brakes to be applied.

The device may be connected to the journal box in any suitable manner, so as to bear on any desired portion of the journal. In the construction shown, a rod or member E, which is made of some suitable fusible material, is so arranged that the end thereof bears on the journal and is, therefore, readily affected by the heat of the journal. This fusible rod is preferably contained in a housing or casing F which is suitably secured at one end in a hole in the side of the journal box, and the other end of which is connected to the air brake pipes of the car or train. A valve G, which may be of any suitable construction, is located in the housing F and is held to its seat by the fusible member E in such a manner that, if the fusible member melts, the valve will open and discharge the air from the brake system, thereby causing the brakes to be applied. This valve may be connected with the fusible member E in any suitable manner. In the construction shown, the valve G is provided with a conical face which is adapted to engage with a corresponding seat in the housing F. The valve is pressed toward its seat against the pressure of the air in the end of the housing by a spring H, which bears at one end against the valve and at its other end against a pin $i$ secured to a rod I. The rod I engages with the fusible member E and presses the same into engagement with the car journal. The ends of the pin $i$ extend through slots $i'$ in the housing F and serve to limit the movement of the rod I in the housing.

In order to adapt the device to be quickly and easily re-adjusted after the fusible member has been melted and to facilitate the insertion of a new fusible member, the housing or casing F is preferably made in two parts $k$ and $k'$, which are connected by a suitable coupling or union K, having a screw threaded engagement with one of the tubes and a flange $k^2$ which is adapted to engage with a flange $k^3$ on the other tube, whereby the two parts of the housing can be readily connected and disconnected. The end of the part $k'$ of the housing is connected to the air brake system by means of a flexible tube or connection L and a pipe $l$, secured to the car or truck. The flexible tube L permits the two parts of the housing F to be separated after the two parts thereof have been disconnected, so that a new fusible member may be inserted into the housing if necessary, and also prevents injury to the device by reason of the motion between the journal and the car body. After the fusible member has been inserted, the parts of the housing can be drawn together by the coupling K, thereby tightening the spring H to seat the valve and press the fusible member into engagement with the journal. The valve seat $g$ may, if desired, be formed in a tube $k^4$ secured to the part $k'$ of the housing by a coupling $k^5$, having holes $k^6$ through which the air discharged from the valve G can pass.

In the operation of the device, if the journal should become heated to such an extent as to melt the fusible member E, the rod I will be moved toward the journal by the spring H. The pressure with which the spring bears against the valve G will thereby be decreased, so that the pressure of the air will unseat the valve, permitting the air to discharge from the pipes of the air brake system through the holes $k^6$ and thus to apply the brakes. These holes are preferably made small to discharge the air gradually and prevent the sudden application of the brakes. The holes also greatly facilitate the location of a hot box after the train or car has been stopped, since noise of the air discharging through the holes serves as a signal to indicate the location of the hot box.

The fusible member, bearing directly against the car journal, is readily affected by the heat of the journal and will cause the stopping of a train or car before the journal is heated sufficiently to be injured. If the journal is well lubricated, the end of the fusible member E will ride smoothly on the journal, but if the journal is dry or not properly oiled, the rod will heat and finally fuse and cause the setting of the brakes. The device also acts as a safeguard in case an axle should break, whereupon the tension on the spring would be immediately released and the brakes applied. The device is reliable in operation, is so constructed that the defective journal can be readily detected if the train or car is stopped, and can be readily re-adjusted after the brakes have been set.

I claim as my invention:

1. In a device of the kind described, the combination with a journal, of a fusible member bearing against said journal, means for holding said fusible member in contact with said journal, and a brake controlling device which is operatively connected with said fusible member, substantially as set forth.

2. In a device of the kind described, the combination with a car journal, of a brake controlling valve which is adapted to be operated to cause the brakes to be applied to the car, a fusible member bearing against said journal, and a connection between said fusible member and said valve for operating said valve to cause the brakes to be applied when the fusible member melts, substantially as set forth.

3. In a device of the kind described, the combination with a car journal, of a brake controlling valve which is adapted to be operated to cause the brakes to be applied to the car, a fusible member which bears against said journal, and a spring which presses said fusible member against said journal and closes said valve, whereby the melting of the fusible member will release the pressure on said spring and cause said valve to be opened to permit the brakes to be applied, substantially as set forth.

4. In a device of the kind described, the combination with a car journal, of a brake controlling valve which is adapted to be operated to cause the brakes to be applied to the car, a fusible member which is located adjacent to said journal, connections between said fusible member and said valve for causing said valve to open when the fusible member melts, a housing in which said fusible member and valve are contained, said housing comprising two separably connected parts which are adapted to be disconnected to permit a fusible member to be inserted therein, substantially as set forth.

5. In a device of the kind described, the combination with a car journal and a journal box, of a housing which is secured at one end to said journal box and connected at its other end to a pipe of an air brake system, a brake controlling valve in said housing which is adapted to be opened to apply the brakes, and a fusible member located in said housing adjacent to said journal and which is operatively connected with said valve to permit the valve to open when the fusible member melts, substantially as set forth.

Witness my hand this 20th day of December, 1911.

LESTER E. MARVIN.

Witnesses:
F. E. PROCHNOW,
C. B. HORNBECK.